Oct. 4, 1932.  F. W. PETERS  1,881,326
UNIVERSAL JOINT
Filed Sept. 17, 1931  2 Sheets-Sheet 2
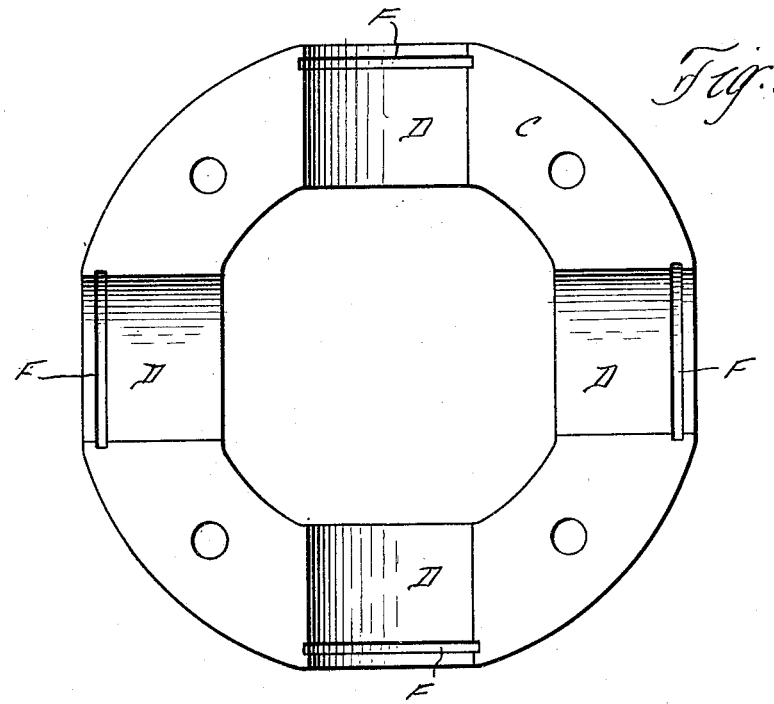
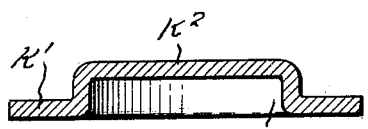
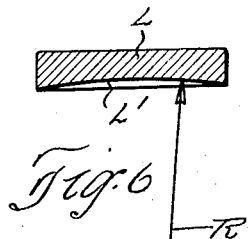
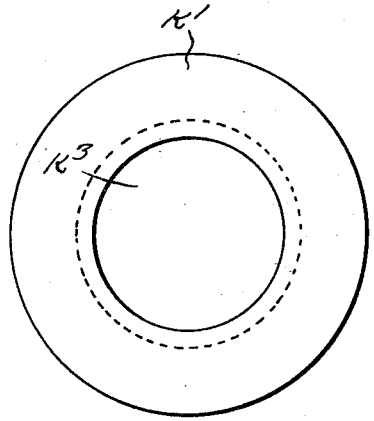
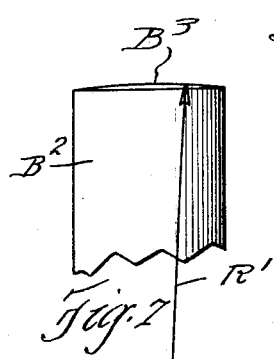
Inventor
Frederick W. Peters
By Hull, Brock & Wert
Attorney Patented Oct. 4, 1932

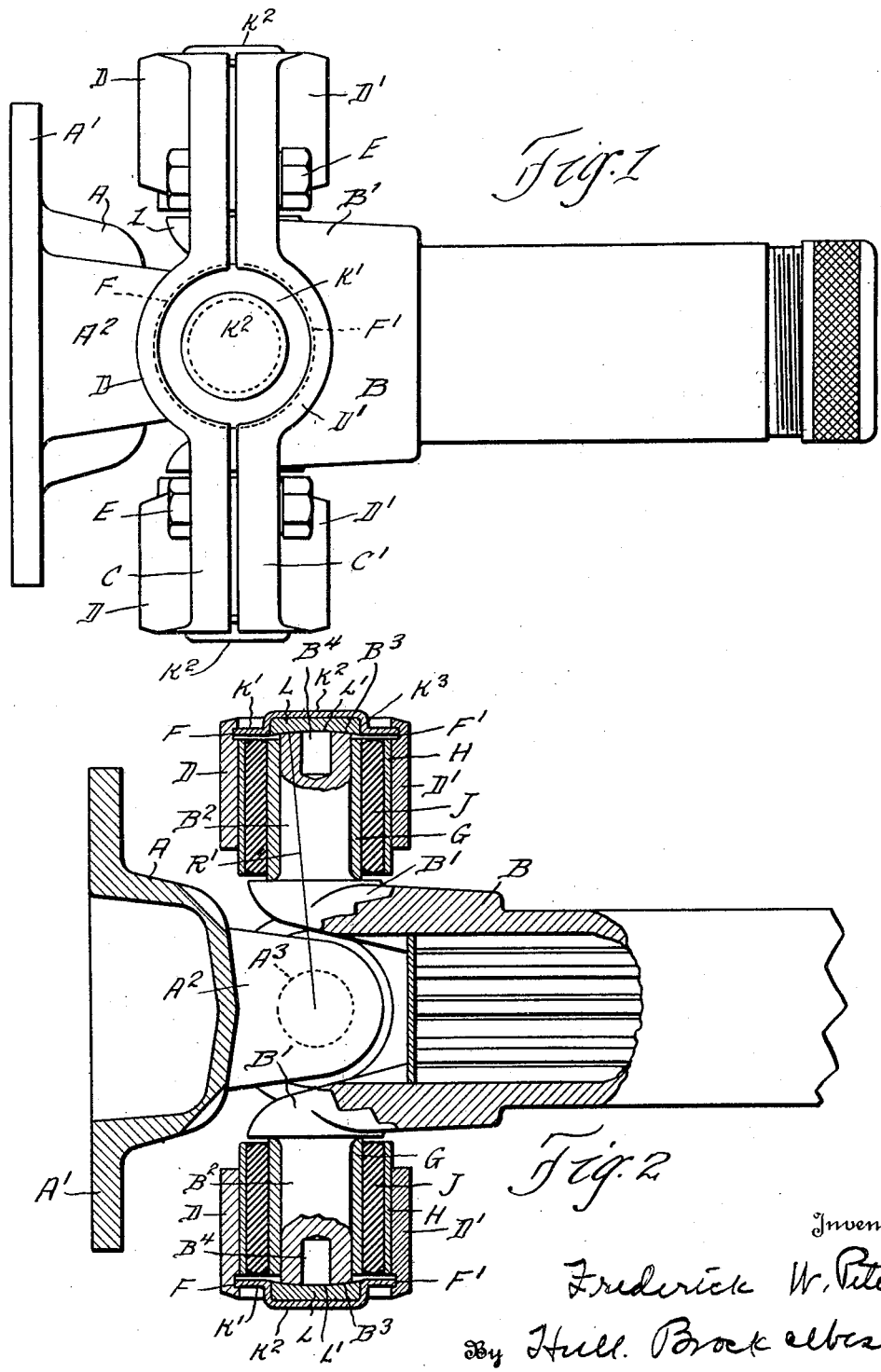

1,881,326

UNITED STATES PATENT OFFICE

FREDERICK W. PETERS, OF CLEVELAND, OHIO

UNIVERSAL JOINT

Application filed September 17, 1931. Serial No. 563,307.

This invention relates to flexible connections, such as universal joints, and has for its general object to provide a connection of this character wherein deformable resilient material, such as rubber, may be interposed between the trunnions and the seats provided therefor in an annular connecting ring, without being subject to the production of vibrations in such joints when operated at high speeds, due to pulsations produced in the deformable material.

The invention of this application consists in certain changes in and improvements over the subject matter of my application Serial No. 549,628, filed July 9, 1931.

As pointed out in my former application, the use of deformable material, such as rubber, for the bushings for universal joints has been attended with certain marked advantages. However, when the bushings, or the deformable material included therein, are permitted to move toward and from the center of the joints of flexible connections, which movements are most liable to occur when the joints or connections are operating at high speeds, such movements produce disagreeable vibrations or pulsating movements in the rubber constituent of the bushing.

In this application, I have devised a different specific means for preventing this action than is shown and described in my former application.

Referring to the drawings herein, Fig. 1 represents a side elevation of a flexible connection of the universal-joint type embodying my invention; Fig. 2, a central vertical section through the joint or connection shown in Fig. 1, a portion of the splined hub and of the yoke flange being shown in elevation, and said view having a line applied thereto indicating the radius of curvature of the inner surface of the thrust block; Fig. 3, an elevation of the inner side of one of the connecting-ring members; Fig. 4, a detail in section; and Fig. 5, a detail in plan, of one of the thrust caps; Fig. 6, a detail in section of a thrust block for the cap shown in the two preceding views, the said figure having a line applied thereto indicating the center of curvature of the inner surface of such block; and Fig. 7, a detail in elevation of one of the trunnions having a line applied thereto indicating the center of curvature of the outer end of such trunnion.

Describing by reference characters the embodiment of my invention shown herein, A and B denote hub members of a universal joint, the member A being provided with a flange A' by means of which it is adapted to be secured to a flange on the hub of one of the shaft sections to be united and which member is provided with yokes $A^2$ each having a trunnion pin $A^3$ formed therewith. The hub B is also provided with yokes B' and with trunnion pins $B^2$ formed therewith. The members A and B are connected by means of a ring comprising a pair of symmetrical annular sections C and C' respectively, each having symmetrical approximately semi-cylindrical seat sections D, D' formed therewith and so arranged that, when the ring sections are connected, as by the bolts E, complete approximately cylindrical seats are formed, the inner end or base of each seat being presented toward the center of the joint and spaced a short distance from the shoulders 1 at the bases of the trunnion pins $A^3$ and $B^2$. It will be noted that each seat comprising a pair of sections D, D' extends outwardly beyond the outer end of the trunnion therewithin and that sectional grooves F and F' are formed within the outer ends of each pair of seat sections and are adapted to form a complete seating groove extending completely around each seat when the ring sections C, C' are drawn together by the bolts E.

Surrounding each trunnion is a composite bushing. This bushing consists of an inner cylindrical metal sleeve G, applied with a driving fit to its trunnion and preferably extending inwardly as far as the shoulder 1 surrounding the base of the trunnion to which it is so applied; an outer cylindrical sleeve H which is clamped tightly within the seat provided therefor by the parts D, D'; and an intermediate annular body J of deformable resilient material, preferably soft rubber, which is compressed between the sleeves F and G, whereby it is placed under longitudinal tension. One manner in which this body may be so assembled between the sleeves G and H is shown and described in my application No. 523,207, filed March 17, 1931.

Inserted in the groove F, F' of each seat D, D' is a cap K. This cap is formed with a peripheral portion K' which is in a plane normal to the axis of the trunnion with which it cooperates. The central portion of each cap is offset outwardly, as shown at K², such offset portion forming a seat for a thrust block L which is fitted within the cylindrical wall K³ of the offset portion. The offset portion of each cap and the thrust block within such portion are of such extent as to enable the block to cover entirely the outer end of a trunnion; and the inner surface of each thrust block is concave, as shown at L', this concavity being spherical and concentric with the center of the joint, as indicated by the radial line R on Fig. 6. The outer end of each trunnion is outwardly convex, as shown at B³, this convexity being spherical and concentric with the center of the joint, as indicated by the lines R' on Figs. 2 and 5.

The block L is preferably made of metal known to the trade as "Oilite" or "Morain" metal and which metal consists of bronze cast in a powdered form and possessing from 25% to 30% porosity. The block when thus formed is saturated with oil under heavy pressure. By grinding a part of the surface of the block after the saturating operation, the escape of oil through such ground surface may be prevented, thereby confining such escape to the surface which has not been ground. As it is used herein, the inner surface of the block L is not ground at all, whereby, at ordinary temperatures, this surface will not exude oil. However, if the block be heated to a temperature of 90°, some oil will exude from the pores and thus serve to lubricate the outer end of each trunnion pin. When the block cools below the temperature mentioned, it reabsorbs such oil as may have been on its surface prior to so cooling. In addition, the outer end of each trunnion pin is provided with a central recess B⁴ for the reception of a lubricant which is non-injurious to the rubber member J of the bushing.

By forming the joint in the manner shown and described herein, all pulsations or vibrations of the rubber member J are prevented, even when running at very high speeds. The opposed end thrust blocks L are held in place by the thrust plates K, the blocks and the plates serving to center the bushings and to prevent movements of the bushings and the trunnions in a direction longitudinally of the trunnions, as will be evident from an inspection of Fig. 2 wherein the ends of the opposed trunnions B² are in engagement with the inner concave surfaces of the thrust blocks L. There can be no outward movement of the sleeves G, due to their driving fit on the trunnions and to their gripping engagement with the members J. It should be noted also that the deformable member J of each bushing is held in non-rotatable relation to its seat D, D' by the bolts E, while the inner sleeve G is held against rotation by its driving fit upon its trunnion pin. The member J is so compressed between the sleeves G and H that there is no rotary movement between the said member and either of the sleeves; and any tendency to rotate is taken up entirely by deformation of the member J.

Having thus described my invention, what I claim is:—

1. A universal joint comprising driving and driven members each having trunnions, a connecting ring comprising sections each having partial seats therein adapted, when the said sections are assembled, to form complete seats, a bushing on each trunnion comprising an external sleeve mounted in a seat of such ring, an internal sleeve fitting tightly on the trunnion, and a member of deformable resilient material interposed between the said sleeves and gripped thereby under longitudinal tension whereby the inner and outer surfaces of the deformable member are held against rotation with respect to said sleeves, a plate extending across each seat beyond the bushing and the trunnion therein, each trunnion having a spherical outer surface concentric with the center of said joint, and a thrust block interposed between the said plate and the spherical outer surface of such trunnion, each thrust block having a spherical surface concentric with the spherical surface of the trunnion and engageable thereby.

2. A universal joint comprising driving and driven members each having trunnions, a connecting ring comprising sections each having partial seats therein adapted, when the said sections are assembled, to form complete seats, a bushing on each trunnion comprising an external sleeve mounted in a seat of such ring, an internal sleeve fitting tightly on the trunnion, and a member of deformable resilient material interposed between the said sleeves and held under longitudinal tension between said sleeves whereby the inner and outer surfaces of the deformable member are held against rotation with respect to said sleeves, a plate extending across each seat beyond the bushing and trunnion therein, each plate having a central outwardly projecting portion constituting a seat, and a thrust block in each seat engageable by the outer end of a trunnion, the inner end of each thrust block and the outer end of each trunnion being provided each with a spherical surface concentric with the center of the said joint.

3. A universal joint comprising driving and driven members each having trunnions, a connecting ring comprising sections each having partial seats therein adapted, when the said sections are assembled, to form complete seats, a bushing on each trunnion comprising an external sleeve mounted in a seat of such ring, an internal sleeve fitting tightly on the trunnion, and a member of deformable resilient material interposed between the said sleeves and held under longitudinal tension between said sleeves whereby the inner and outer surfaces of the deformable member are held against rotation with respect to said sleeves, a plate extending across each seat beyond the bushing and trunnion therein, each plate having a central outwardly projecting portion constituting a seat, and a thrust block in each seat engageable by the outer end of a trunnion, the inner end of each thrust block and the outer end of each trunnion being provided each with a spherical surface concentric with the center of the said joint, the said thrust block being made of lubricant-charged metal.

4. A universal joint comprising driving and driven members each having trunnions, means flexibly connecting the trunnions of one of said members with the trunnions of the other member, said connecting means comprising a seat for each trunnion and a bushing member of deformable resilient material on each trunnion interposed between each seat and the trunnion therewithin and held under longitudinal tension thereby, a plate extending across each seat beyond the bushing member and the trunnion therein, each plate having a central outwardly projecting portion constituting a seat, and a thrust block in each seat engageable by the outer end of a trunnion, the inner end of each thrust block and the outer end of each trunnion being provided each with a spherical surface concentric with the center of the said joint.

5. A flexible conection comprising driving and driven members each having trunnions, means flexibly connecting the trunnions of one of said members with the trunnions of the other member, said connecting means comprising a seat for each trunnion and a bushing member of deformable resilient material on each trunnion interposed between each seat and the trunnion therewithin and held under longitudinal tension thereby, a plate extending across each seat beyond the bushing member and the trunnion therein, each plate having a central outwardly projecting portion constituting a seat, and a thrust block in each seat engageable by the outer end of a trunnion, the inner end of each thrust block and the outer end of each trunnion being provided each with a spherical surface concentric with the center of the said joint, each trunnion being provided with a recess extending inwardly from the outer end therefor for the accommodation of a lubricant non-injurious to the deformable bushing member and each thrust block being formed of a lubricant-charged metal.

In testimony whereof, I hereunto affix my signature.

FREDERICK W. PETERS.